United States Patent [19]
Clark et al.

[11] 3,868,318
[45] Feb. 25, 1975

[54] SEPARATION OF FINE SOLIDS WITH ADSORBING BODIES

[75] Inventors: Norman Owen Clark, Par, Cornwall; William Windle, Anstell, Cornwall, both of England

[73] Assignee: English Clays Lovering Pochin & Company Limited, Cornwall, England

[22] Filed: Oct. 30, 1973

[21] Appl. No.: 411,152

Related U.S. Application Data

[63] Continuation of Ser. No. 133,387, April 12, 1971, abandoned.

[30] Foreign Application Priority Data

Apr. 15, 1970 Great Britain............... 18067/70
Jan. 8, 1971 Great Britain............... 1112/71

[52] U.S. Cl................. 209/9, 209/47, 209/166
[51] Int. Cl................................ B03b 1/04
[58] Field of Search............ 209/3, 9, 166, 45–47, 209/49, 163, 5, 164, 10

[56] References Cited
UNITED STATES PATENTS

| | | | |
|---|---|---|---|
| 471,174 | 3/1892 | Mebron | 209/163 |
| 956,773 | 5/1910 | Lockwood | 209/47 |
| 959,239 | 3/1910 | Lockwood | 209/47 |
| 1,377,937 | 5/1921 | Spearman | 209/49 |
| 2,981,630 | 4/1961 | Rowland | 209/5 X |
| 2,990,958 | 7/1961 | Greene | 209/166 |
| 3,224,582 | 12/1965 | Fannicelli | 209/166 |
| 3,240,556 | 3/1966 | Bhappu | 209/166 X |
| 3,256,140 | 6/1966 | Pushmann | 209/166 X |
| 3,331,505 | 7/1967 | Mercade | 209/166 X |
| 3,432,030 | 3/1969 | Oliviler | 209/5 |
| 3,454,161 | 7/1969 | Mercade | 209/167 |
| 3,539,003 | 11/1970 | Bidwell | 209/5 |
| 3,670,883 | 6/1972 | Weir | 209/5 |

FOREIGN PATENTS OR APPLICATIONS 1,104,281  2/1968  Great Britain................. 209/5

*Primary Examiner*—Robert Halper
*Attorney, Agent, or Firm*—Larson, Taylor and Hinds

[57] ABSTRACT

Fine particles of one mineral are separated from a mixture of the fine particles of said one mineral and other particles by (i) causing said fine particles to come into contact with solid bodies having a mean diameter of at least 10 microns so that the fine particles are preferably absorbed on the surfaces of said solid bodies, and (ii) separating said solid bodies holding the absorbed fine particles from the remainder of the mixture.

16 Claims, No Drawings

SEPARATION OF FINE SOLIDS WITH ADSORBING BODIES

This is a continuation, of application Ser. No. 133,387, now abandoned, filed Apr. 12, 1971.

BACKGROUND OF THE INVENTION

This invention relates to the separation of particulate materials.

In many industries small solids are separated from larger particles by gravitational settling techniques or by centrifugal sedimentation. However, such processes are seldom carried out commercially when the small particles to be separated are so fine as to have a gravitational settling velocity of not more than 1 millimetre/hour at 20°C in a fully deflocculated aqueous suspension.

It is an object of the present invention to provide a method whereby such fine particles can be separated.

SUMMARY OF THE INVENTION

Accordingly the present invention provides a method of separating fine particles, having a gravitational settling velocity in a fully deflocculated aqueous suspension of not more than 1 millimetre/hour at 20°C, of one mineral from a mixture of the fine particles of said one mineral and other particles, which method comprises (i) causing said fine particles to come into contact with solid bodies having a mean diameter of at least 10 microns so that the fine particles of said one mineral are preferentially adsorbed on the surface of said solid bodies; and (ii) separating said solid bodies holding the adsorbed fine particles of said one mineral from the remainder of the particles.

Embodiments of the present invention provide a method of separating fine particles of a given mineral from coarser particles of the same mineral, or of separating fine particles of one mineral from a mixture of fine particles of said one mineral and one or more other minerals.

DESCRIPTION OF THE PREFERRED EMBODIMENTS

The solid bodies are preferably coarse particles of a granular form. Alternatively, the solid bodies can be short fibres having, for example, a length of from 1 to 2 millimetres.

After separating the solid bodies holding the adsorbed fine particles of said one mineral from the remainder of the particles, the fine particles can be removed from the solid bodies on which they are adsorbed.

In a first embodiment of the present invention, a first mineral, containing fine particles having a settling velocity of less than one millimetre/hour which are to be separated from the larger particles, is made into a deflocculated slurry, for example by adding to an aqueous slurry of the first mineral from 0.05 to 0.50% by weight based on the weight of the first mineral of a suitable deflocculating agent, e.g., a condensed phosphate (e.g., sodium hexametaphosphate, tetrasodium pyrophosphate or sodium tri-polyphosphate), a soluble salt of a polysilicic acid or a soluble salt of a polyacrylic or polymethacrylic acid having a number average molecular weight in the range of from 700 to 10,000 or a water-soluble copolymeric deflocculant such as that formed by polymerising together two or more monomers, one of which is a vinyl compound and another of which is an unsaturated carboxylic acid or a compound capable of hydrolysis to form an unsaturated carboxylic acid, having a number average molecular weight in the range of from 700 to 10,000. This deflocculated slurry is then brought into contact with solid bodies, in the form of a second mineral, consisting of particles substantially larger than the largest particles present in the first mineral, and is treated with a surface-active reagent. This second mineral can be the same as or different from the first mineral, and generally will have a gravitational settling velocity of at least 20 centimetres/hour in an aqueous suspension at 20°C. In some cases the first mineral will not exist in coarse sizes, for example when the first mineral is kaolin; it will then be necessary to use as the second mineral a mineral different from the first mineral. In other cases, specific properties of certain minerals can be exploited; for example, there can be utilised as the second mineral (i) a mineral, e.g. talc, whose hydrophobic surface minimises the consumption of surface-active reagents, or (ii) a mineral which chemisorbs the surface-active reagent, or (iii) a mineral having surfaces bearing an electrical charge opposite to that borne on the surface of the first mineral. The surface-active reagents usable in this embodiment depend to some extent on the type of first mineral being treated, but can generally be a long chain amine, preferably having at least 8 carbon atoms, or a long chain polymeric flocculant (number average molecular weight of at least 100,000), for example a polyacrylamide or a polyacrylate salt. When the first mineral and the second mineral are brought into contact, the fine particles of the first mineral (because they have the largest surface area/weight ratio) become adsorbed on the coarse particles of the second mineral. In some cases, it may be necessary to add further small amounts of surface-active reagent to the suspension of mixed minerals. The fine particles of the first mineral adsorbed on the coarse particles of the second mineral can subsequently be separated from the other particles by known methods of separation, for example by sieving, by use of hydraulic cyclones or by batch or continuous gravitational sedimentation processes; and the fine particles of the first mineral can be separated from the particles of the second mineral on which they were adsorbed by, for example, agitating the particles in an alkaline solution, e.g., a solution containing 5% by weight of sodium hydroxide.

In a second embodiment of the invention, a first mineral is made into a pulp. Solid bodies comprising a second mineral, which is of a different species from the first mineral, are coated with a surface-active reagent and are brought into contact with the pulp containing the first mineral. The fine particles of the first mineral are adsorbed by the particles of the second mineral, which are then removed from the suspension by a froth flotation process. The froth flotation process employed advantageously comprises either Procedure A or Procedure B below:

PROCEDURE A

The mixture of first and second minerals is formed into an aqueous slurry having a solids content of at least 20% by weight and is then conditioned at this solids content by agitating the slurry. During or before the conditioning of the mixture there is mixed with the aqueous slurry (a) a deflocculant, (b) an alkali to raise the pH of the aqueous slurry to an alkaline value and (c) a collector for one of the two minerals. After conditioning there is added to the slurry a frothing agent. The reagentised aqueous mineral slurry thus formed is then introduced, preferably after dilution if necessary to a solids content in the range of from 15 to 30% by weight, into a froth flotation cell having a central, internal, submerged impeller wherein it is subjected to a froth flotation process which yields a froth product, consisting substantially of one of the two minerals, and a machine discharge product consisting substantially of the other mineral. The deflocculant used in this procedure can be, for example, sodium silicate which is advantageously used in an amount varying from 1.0 to 12.0 lb per ton of the mixture of the first and second minerals. The alkali used to raise the pH of the aqueous slurry to an alkaline value can be ammonium hydroxide although similar materials can alternatively be used. In the case of ammonium hydroxide there will generally be used from 1.0 to 12.0 lb per ton of mineral mixture. The collector can be, for example, a fatty acid containing from 8 to 20 carbon atoms. Preferred collectors are oleic acid and lauric acid; in the case of oleic acid there will generally be used from 1.5 to 7.5 lb thereof per ton of mineral mixture. The frothing agent can be, for example, pine oil or a methyl or ethyl ether of a polypropylene glycol. An activator can also be used which can be, for example, a water-soluble salt of a heavy metal or of an alkaline earth metal (including magnesium), for example lead acetate or calcium chloride.

PROCEDURE B

The mixture of first and second minerals is formed into an aqueous slurry having a solids content of at least 20% by weight, and there is then added to the mineral slurry a mineral acid to reduce the pH to 4.0 or below. A cationic collector is added to the aqueous slurry together with a frothing agent. The reagentised aqueous slurry thus formed is then conditioned at a solids content of at least 20% by weight. The reagentised and conditioned mineral slurry is then subjected to a froth flotation process, preferably after dilution if necessary to a solids content in the range of from 15 to 30% by weight, in a froth flotation cell having a central, internal, submerged impeller. The froth product, containing substantially one of the two minerals, is collected and sprayed with water under pressure to destroy the froth. The cationic collector employed is advantageously an aliphatic amine having from 8 to 20 carbon atoms or an acetate or hydrochloride of such an amine, and is advantageously used in an amount in the range of from 0.2 to 2.0 lb of collector per ton of mineral mixture. The frothing agent can be, for example, pine oil or a methyl or ethyl ether of a polypropylene glycol, and is employed in an amount which is approximately the same as the amount of collector employed. The fine particles of the first mineral can subsequently be separated from the particles of the second mineral by known methods, for example by the methods described hereinbefore. The surface-active reagents which can be used in this embodiment include long chain polymeric flocculants, for example, a polyacrylamide or a polyacrylate salt, having a number average molecular weight of at least 100,000. In this embodiment it is necessary to employ greater quantities of surface-active reagents than in the first embodiment; it does, however, enable a finer sized second mineral to be used.

In a third embodiment of the present invention, a first mineral is made into a deflocculated suspension, for example by the methods described hereinbefore. Solid bodies in the form of fibres are then added to the suspension of the first mineral. The fibres can comprise, for example, one or more of the following:—
  a. those fibres, e.g., cellulosic fibres, which have, in their natural state, hydrogen ions or other cationic species disposed along their length;
  b. those fibres which can adsorb a cationic surface-active reagent to produce fibres which have similar adsorption properties to those fibres of type (a) above; or
  c. fibrous minerals, e.g. asbestos.

The fibres are dispersed in the deflocculated suspension of the first mineral, e.g., by agitation, whereupon the fine particles of the first mineral adhere to the surface of the fibres. The fibres are then separated from the suspension, and the fine particles of the first mineral can be separated therefrom by known methods. Surface-active reagents usable in this embodiment are those which produce cationic species on the surface of the fibres; preferably cationic starches, polyamines or polyethylimines are used.

In a fourth embodiment of the present invention, a mixture of minerals comprising predominantly fine particles having a settling velocity of less than one millimetre/hour is made into a deflocculated slurry, for example by adding to a slurry of the minerals from 0.05 to 0.50 percent by weight, based on the total weight of the mixture of fine minerals, of a suitable deflocculating agent, e.g., a condensed phosphate (e.g., sodium hexametaphosphate, tetrasodium pyrophosphate or sodium tripolyphosphate), a water-soluble salt of a polysilicic acid, a water soluble salt of a polyacrylic or polymethacrylic acid having a number average molecular weight in the range of from 700 to 10,000, or a water-soluble copolymeric deflocculant such as that formed by polymerising together two or more monomers, one of which is a vinyl compound and another of which is an unsaturated carboxylic acid or a compound capable of hydrolysis to form an unsaturated carboxylic acid, having a number average molecular weight in the range of from 700 to 10,000. This deflocculated slurry is then brought into contact with solid bodies, in the form of a coarse mineral consisting of particles having a mean diameter of at least 10 microns, and being substantially larger than the largest particle present in the mixture of minerals, and is treated with a surface-active reagent. The coarse mineral can be of the same mineral species as, or of a different mineral species from, that of the fine particles which the coarse mineral is required to adsorb preferentially; generally the particles of the coarse mineral will have a gravitational settling velocity of at least 20 centimetres/hour in an aqueous suspension at 20°C. Where the mineral to be adsorbed preferentially does not exist in coarse sizes, for example where the mineral is kaolin, it will be necessary to use a different species as the coarse mineral. In other cases, specific mineral properties can be exploited; for example, talc has a naturally hydrophobic surface and therefore requires a smaller quantity of surface-active reagent. Alternatively, there can be utilised minerals which chemisorb the surface-active reagent, or minerals which have surfaces bearing an electrical charge opposite to that carried on the fine particles of the mineral species which is to be preferentially adsorbed.

The surface-active reagent usable in this embodiment of the invention depends to some extent on the type of mineral being treated, but can generally be a long chain amine, preferably having at least 8 carbon atoms, or a polymeric flocculant having a number average molecular weight of at least 100,000, for example a polyacrylamide or a polyacrylate salt.

When the mixture of fine particles of different mineral species is brought into contact with the coarse mineral particles, fine particles of one particular mineral species are preferentially adsorbed onto the particles of the coarse mineral, the mineral species which is preferentially adsorbed generally being that mineral which has the greatest affinity for the surface-active reagent (which is on the surface of the coarse mineral particles) or for the natural surface of the coarse mineral particle itself. In some cases, it may be necessary to add further small amount of surface-active reagents to the suspension.

The fine particles of that mineral species which are preferentially adsorbed onto the particles of the coarse mineral can subsequently be separated from the fine particles of the other components of the mixture of mineral species by known methods of separation, for example by the methods hereinbefore described. The fine particles of the preferentially adsorbed mineral species can be separated from the particles of the coarse mineral onto which they are adsorbed by, for example, agitating the coarse mineral particles in an alkaline solution, e.g., a solution containing 5% by weight of sodium hydroxide.

In a fifth embodiment of the present invention, a mixture of fine particles of different mineral species is made into a deflocculated suspension, for example by the method described above. Solid bodies in the form of fibres are then added to the suspension of the mineral particles. The fibres can comprise one or more of the following:

a. those fibres, e.g. cellulosic fibres, which have, in their natural state, hydrogen ions, or other cationic species, disposed along their length;

b. those fibres which can adsorb cationic surface-active reagents to produce fibres which have similar adsorption properties to those fibres of type (a) above; and c. fibrous minerals, e.g., asbestos. The fibres are dispersed in the deflocculated suspension of the mixture of fine particles of different mineral species, by, for example, agitation, whereupon the fine particles of one mineral species are preferentially adsorbed onto the surface of the fibres. The fibres are then separated from the suspension, and the fine particles of the preferentially adsorbed mineral species can be separated therefrom by known methods. The surface-active reagents usable in this embodiment are those which produce cationic species on the surface of the fibres; preferably cationic starches, polyamines, or polyethylimines are used.

This invention wil be illustrated by the following Examples.

EXAMPLE 1

Particles of crushed vein calcite, substantially within the size range No. 52 to 100 mesh British standard sieve were coated with a dilute solution of a polyacrylamide whose number average molecular weight was 1,000,000 in an amount equivalent to 0.1 lb of polyacrylamide per long ton of the calcite. A 10% w/w suspension of kaolin of which 1% by weight consisted of particles larger than 10 microns e.s.d. and 35% by weight of particles smaller than 0.5 microns e.s.d. (i.e., containing particles having a gravitational settling velocity of not more than 1 millimetre/hour at 20°C) was deflocculated with 0.30% by weight of sodium hexametaphosphate based on the weight of dry kaolin. The treated calcite (which constituted the solid bodies) was then added to the deflocculated kaolin suspension, and the mixture was mildly agitated for 10 minutes, after which time the suspension was allowed to stand for 3 minutes. The mixture separated into a lower layer comprising calcite particles and fine kaolin particles adhering thereto and a supernatant layer comprising the less fine kaolin particles. The particle size characteristics of the kaolin in the supernatant layer were then determined and it was found that the kaolin contained 1.5% by weight of particles larger than 10 microns e.s.d. and 13% by weight of particles smaller than 0.5 microns e.s.d. Thus the fine particles having a gravitational settling velocity of not more than 1 mm/hr. at 20°C were separated from coarser particles of the kaolin. The adsorbed fine particles of kaolin were then removed from the calcite by agitating the mixture in an aqueous solution containing 5% by weight of sodium hydroxide and then allowing the calcite to settle, leaving the kaolin in suspension.

EXAMPLE 2

A sample of calcite substantially between No. 52 and No. 200 mesh B.S.S. was coated with a dilute aqueous suspension of a polyacrylamide having a number average molecular weight of 500,000 at a dose rate of 0.1 lb/long ton of calcite. A 10% w/w suspension of kaolin particles was then taken which contained 1% by weight of particles larger than 10 microns e.s.d. and 41% by weight of particles smaller than 0.5 microns e.s.d. (i.e., containing particles having a gravitational settling velocity of not more than 1 mm./hr. at 20°C). This suspension was then deflocculated by the addition of 5 lbs./long ton of sodium silicate. The reagentised calcite, which constituted the solid bodies, was then added to the kaolin suspension and the mixture agitated for 10 minutes. After this period, 0.2 lb./long ton of oleic acid were added and the mixture agitated for a further 15 minutes, after which time the mixture was transferred to a froth flotation cell where the calcite was removed in the forth product. The particle size of the kaolin in the machine discharge product was then measured and found to contain 2.1% particles larger than 10 microns e.s.d. and 22% particles smaller than 0.5 microns e.s.d. Thus the fine particles having a gravitational settling velocity of not more than 1 mm./hr. at 20°C were separated from coarser particles.

EXAMPLE 3

A sample of bleached sulphite wood pulp was taken and any fines removed therefrom by washing the fibres on a 100 mesh screen. The fibres were then suspended in water to give a 5% w/w suspension, were agitated, and a cationic starch known as "Q-TAC," manufactured by Corn Products Limited, was added at a dose rate of 5 lbs./long ton. The reagentised fibres, which constituted the solid bodies, were than added to a 15% w/w aqueous kaolin suspension which contained 1.0% by weight of particles larger than 10 microns e.s.d. and 29% by weight of particles smaller than 0.5 microns e.s.d., i.e. containing particles having a g.s.v. of not more than 1 mm./hr. at 20°C. The fibres were agitated for 6 minutes and then removed by screening on a 100 mesh screen. The kaolin suspension passing through the screen had a particle size distribution such that 1.5% by weight of the particles were larger than 10 microns e.s.d. and 15% by weight of the particles were smaller than 0.5 microns e.s.d. Thus the particles having a g.s.v. of not more than 1 mm./hr. at 20°C were separated from coarser particles.

EXAMPLE 4

A 10% w/w suspension of kaolin, of which 1% by weight consisted of particles larger than 10 microns e.s.d. and 35% by weight of particles smaller than 0.5 microns e.s.d., i.e. containing particles having a g.s.v. of not more than 1 mm/hr. at 20°C. This suspension was deflocculated with 0.30% by weight of sodium hexametaphosphate based on the weight of dry kaolin. The deflocculated aqueous suspension of kaolin was passed upwards through a fixed bed of particles of vein calcite which were in the size range of from No. 52 to 100 mesh B.S. sieve. The particles of vein calcite had been coated with a polyacrylamide of number average molecular weight 1,000,000 at a loading of 0.1 lb. of polyacrylamide per long ton of calcite and constituted the solid bodies. The aqueous suspension was passed through the bed of treated calcite with recirculation for a total time of 15 minutes. The particle size distribution of the kaolin in suspension was then determined and it was found that 2% by weight of the particles were larger than 10 microns e.s.d. and 11% by weight smaller than 0.5 microns e.s.d. Thus the desired separation was achieved.

EXAMPLE 5

Particles of crushed vein calcite, substantially within the size range from 125 to 250 microns diameter, were coated with a dilute solution of a polyacrylamide whose number average molecular weight was 1,000,000 in an amount equivalent to 0.1 lb of polyacrylamide per long ton of the calcite. A 10% w/w suspension of an impure kaolin mineral containing, as an impurity, 5% by weight of fine quartz, the mineral mixture having a particle size distribution such that 73% by weight consisted of particles having a gravitational settling velocity of not more than 1 millimetre/hr, i.e., containing fine particles having a g.s.v. of not more than 1 mm/hr. at 20°C. The suspension was deflocculated with 0.30% by weight of sodium hexametaphosphate based on the weight of dry solids. The treated calcite, which constituted the solid bodies, was then added to the deflocculated, impure kaolin suspension and the mixture was mildly agitated for 10 minutes, after which time the suspension was allowed to stand for three minutes. The mixture separated into a lower layer comprising calcite particles and predominantly fine kaolin particles adhering thereto, and a supernatant layer comprising most of the coarse particles and some kaolin particles. The calcite particles with the fine kaolin particles adhering thereto were then separated from the supernatant layer by pouring the mixture through a No. 300 mesh B.S. sieve (nominal aperature 3 microns) and the fine kaolin particles were separated from the calcite by stirring the particles for 10 mintues in a solution containing 5% w/v of sodium hydroxide. The mixture was again poured through a No. 300 mesh B.S. sieve and the suspension passing the sieve was retained. The solid particles in this suspension were found to comprise kaolin together with only 0.5% by weight of quartz, and 86% by weight of the particles had a gravitational settling velocity of not more than 1 millimetre/hr. Thus the desired separation was achieved.

We claim:

1. A method of separating fine particles having a gravitational settling velocity in a fully deflocculated aqueous suspension of not more than 1 millimetre/hour at 20°C, of one mineral from coarser particles of the same mineral, which method comprises (i) forming a deflocculated aqueous suspension of the particles, the aqueous suspension including a cationic surface active agent; (ii) causing the particles in said deflocculated aqueous suspension to come into contact with solid bodies having a mean diameter which is at least 10 microns and not more than 1 cm., the bodies being (a) chemically different from said one mineral, (b) capable of adsorbing said cationic surface active agent to produce a positively charged surface coating thereon, and (c) selected from the group consisting of coarse, granular particles; short cellulosic fibres having a length of from 1 to 2 mm; and short asbestos fibres having a length of from 1 to 2 mm, whereby said fine particles are preferentially adsorbed on the positively charged surfaces of the solid bodies; (iii) separating the solid bodies holding the adsorbed fine particles from the remainder of the suspension; and (iv) separating said fine particles from said solid bodies by agitating the solid bodies in an alkaline solution.

2. A method according to claim 1, wherein the solid bodies are said short cellulosic fibres or said short asbestos fibres.

3. A method according to claim 1, wherein said cationic surface active agent is selected from the group consisting of cationic starches, polyamines and polyethylamines.

4. A method according to claim 1, wherein said deflocculated aqueous suspension contains a deflocculating agent which is selected from the group consisting of condensed phosphates, watersoluble salts of polysilicic acids, water-soluble salts of polyacrylic and polymethacrylic acids having a number average molecular weight in the range of from 700 to 10,000 and water-soluble copolymeric deflocculants formed by polymerising together at least two monomer, one of which is a vinyl compound and another of which is selected from the group consisting of unsaturated carboxylic acids and compounds capable of hydrolysis to form unsaturated carboxylic acids, said water-soluble copolymeric deflocculants having a number average molecular weight in the range of from 700 to 10,000.

5. A method according to claim 1, wherein said cationic surface active agent is selected from the group consisting of long chain amines and long chain cationic, polymeric flocculants having a number average molecular weight of at least 100,000.

6. A method according to claim 1, wherein the solid bodies holding the adsorbed fine particles are separated from the remainder of the suspension by a method selected from the group consisting of sieving, hydraulic cycloning, batch gravitational sedimentation and continuous gravitational sedimentation.

7. A method according to claim 1, wherein the solid bodies holding the adsorbed fine particles are separated from the remainder of the suspension by a froth floatation process.

8. A method of separating fine particles, having a gravitational settling velocity in a fully deflocculated aqueous suspension of not more than 1 mm/hour at 20°C., of one mineral from a mixture of the fine particles of said one mineral and other particles, which method comprises (i) forming a deflocculated aqueous suspension of the particles, the aqueous suspension including a cationic surface active agent; (ii) causing the particles in said deflocculated aqueous suspension to come into contact with solid bodies having a mean diameter which is at least 10 microns and not more than 1 cm, the solid bodies being (a) chemically different from said one mineral, (b) capable of adsorbing said cationic surface active agent to produce a positively charged surface coating thereon, and (c) selected from the group consisting of coarse, granular particles; short cellulosic fibres having a length of from 1 to 2 mm; short asbestos fibres having a length of from 1 to 2 mm, whereby said fine particles are preferentially adsorbed on the positively charged surfaces of the solid bodies; (iii) separating the solid bodies holding the adsorbed fine particles from the remainder of the suspension; and (iv) separating said fine particles from said solid bodies by agitating the solid bodies in an alkaline solution.

9. A method according to claim 8, wherein the solid bodies are said short cellulosic fibres or said short asbestos fibres.

10. A method according to claim 8, wherein said cationic surface active agent is selected from the group consisting of cationic starches, polyamines and polyethylamines.

11. A method according to claim 8, wherein said deflocculagent which is selected from the group consisting of condensed phosphates, water-soluble salts of polysilicic acids, water-soluble salts of polyacrylic and polymethacrylic acids having a number average molecular weight in the range of from 700 to 10,000 and water-soluble copolymeric deflocculants formed by polymerising together at least two monomers, one of which is a vinyl compound and another of which is selected from the group consisting of unsaturated carboxylic acids and compounds capable of hydrolysis to form unsaturated carboxylic acids, said water-soluble copolymeric deflocculants having a number average molecular weight in the range of from 700 to 10,000.

12. A method according to claim 8, wherein said cationic surface active agent is selected from the group consisting of long chain amines and long chain cationic, polymeric flocculants having a number average molecular weight of at least 100,000.

13. A method according to claim 8, wherein the solid bodies holding the adsorbed fine particles are separated from the remainder of the suspension by a method selected from the group consisting of seiving, hydraulic cyloning, batch gravitational sedimentation and continuous gravitational sedimentation.

14. A method according to claim 8, wherein the solid bodies holding the adsorbed fine particles are separated from the remainder of the suspension by a froth floatation process.

15. A method of separating fine particles, having a gravitational settling velocity in a fully deflocculated aqueous suspension of not more than 1 mm/hour at 20°C., of one mineral from coarser particles of the same mineral, which method comprises (i) forming a deflocculated aqueous suspension of the particles, the aqueous suspension including a deflocculating agent which is selected from the group consisting of condensed phosphates, water-soluble salts of polysilicic acids, water-soluble salts of polyacrylic and polymethacrylic acids having a number average molecular weight in the range of from 700 to 10,000 and water-soluble copolymeric deflocculants formed by polymerising together at least two monomers, one of which is a vinyl compound and another of which is selected from the group consisting of unsaturated carboxylic acids and compounds capable of hydrolysis to form unsaturated carboxylic acids, said water-soluble copolymeric deflocculants having a number average molecular weight in the range of from 700 to 10,000, the deflocculating agent comprising from 0.05 to 0.50% by weight based on the total weight of the particles of said one mineral, the aqueous suspension also including a cationic surface active agent which is selected from the group consisting of cationic starches, polyamines, polyethylamines, long chain amines and long chain cationic, polymeric flocculants having a number average molecular weight of at least 100,000; (ii) causing the particles in said deflocculated aqueous suspension to come into contact with solid bodies having a mean diameter which is at least 10 microns and not more than 1 cm, the solid bodies being (a) chemically different from said one mineral, (b) capable of adsorbing said cationic surface active agent to produce a positively charged surface coating thereon, and (c) selected from the group consisting of coarse, granular particles, short cellulosic fibres having a length of from 1 to 2 mm and short asbestos fibres having a length of from 1 to 2 mm, whereby said fine particles are preferentially adsorbed on the positively charged surfaces of the solid bodies; (iii) separating the solid bodies holding the adsorbed fine particles from the remainder of the suspension by a method selected from the group consisting of sieving, hydraulic cycloning, batch gravitational sedimentation, continuous gravitational sedimentation and froth floatation; and (iv) separating said fine particles from said solid bodies by agitating the solid bodies in an alkaline solution.

16. A method of separating fine particles having a gravitational settling velocity in a fully deflocculated aqueous suspension of not more than 1 millimetre/hour at 20°C, of one mineral from coarser particles of the same mineral, which method comprises (i) forming a deflocculated aqueous suspension of the particles, the aqueous suspension including a cationic surface active agent; said deflocculated aqueous suspension contains a deflocculating agent which is selected from the group consisting of condensed phosphates, water-soluble salts of polysilicic acids, water-soluble salts of polyacrylic and polymethacrylic acids having a number average molecular weight in the range of from 700 to 10,000 and water-soluble copolymeric deflocculants formed by polymerising together at least two monomer, one of which is a vinyl compound and another of which is selected from the group consisting of unsaturated carboxylic acids and compounds capable of hydrolysis to form unsaturated carboxylic acids, said water-soluble copolymeric deflocculants having a number average molecular weight in the range of from 700 to 10,000; (ii) causing the particles in said deflocculated aqueous suspension to come into contact with solid bodies having a mean diameter which is at least 10 microns and not more than 1 cm., the bodies being (a) chemically different from said one mineral, (b) capable of adsorbing said cationic surface active agent to produce a positively charged surface coating therein, and (c) selected from the group consisting of coarse, granular particles and short fibres having a length of from 1 to 2 mm, wherein said fine particles are preferentially adsorbed on the positively charged surfaces of the solid bodies; (iii) separating the solid bodies holding the adsorbed fine particles from the remainder of the suspension; and (iv) separating said fine particles from said solid bodies by agitating the solid bodies in an alkaline solution.

* * * * *